(12) United States Patent
Taylor

(10) Patent No.: US 7,287,632 B1
(45) Date of Patent: Oct. 30, 2007

(54) VEHICLE CLUTCH BASKET

(75) Inventor: Michael F. Taylor, Carpinteria, CA (US)

(73) Assignee: Barnett Tool & Engineering, Ventura, CA (US)

( * ) Notice: Subject to any disclaimer, the term of this patent is extended or adjusted under 35 U.S.C. 154(b) by 196 days.

(21) Appl. No.: 11/090,821

(22) Filed: Mar. 24, 2005

(51) Int. Cl.
F16D 13/52 (2006.01)
F16D 13/58 (2006.01)

(52) U.S. Cl. .............................. 192/70.17; 192/70.19; 384/284

(58) Field of Classification Search ................ 384/284, 384/439, 282
See application file for complete search history.

(56) References Cited

U.S. PATENT DOCUMENTS

| 1,683,806 | A | * | 9/1928 | Richards, Jr. ............... 192/115 |
| 3,305,060 | A | * | 2/1967 | Zeidler ..................... 192/70.19 |
| 3,438,464 | A | * | 4/1969 | Barrington ................. 192/70.2 |
| 4,505,365 | A | | 3/1985 | Bopp |
| 4,534,454 | A | | 8/1985 | Brooks |
| 4,540,076 | A | | 9/1985 | Bopp |
| 4,585,105 | A | * | 4/1986 | Iio et al. ..................... 192/70.2 |
| 4,986,403 | A | | 1/1991 | Tipton |
| 5,042,632 | A | * | 8/1991 | Jackel ........................ 464/68.3 |
| 5,129,497 | A | | 7/1992 | Kelley |
| 5,201,237 | A | | 4/1993 | Berndtson |
| 5,393,266 | A | * | 2/1995 | Braun et al. ............. 192/70.17 |
| 5,755,314 | A | * | 5/1998 | Kanda et al. ............ 192/70.12 |
| 5,863,274 | A | * | 1/1999 | Jackel ..................... 192/70.17 |
| 5,980,387 | A | * | 11/1999 | Friedmann et al. ........ 464/68.3 |
| 6,360,861 | B1 | * | 3/2002 | Sumi et al. .............. 192/70.17 |
| 6,708,807 | B1 | * | 3/2004 | Martin ..................... 192/70.19 |
| 2002/0153221 | A1 | * | 10/2002 | Schnepf ................... 192/70.17 |
| 2004/0000443 | A1 | | 1/2004 | Maimone |
| 2004/0084274 | A1 | | 5/2004 | Schreiber et al. |
| 2004/0134740 | A1 | | 7/2004 | Gerathewohl et al. |

* cited by examiner

Primary Examiner—Rodney H. Bonck
(74) Attorney, Agent, or Firm—Michael Blaine Brooks, P.C.; Michael Blaine Brooks; Kenneth J. Hovet

(57) ABSTRACT

A clutch basket is provided having an upper side with upstanding fingers. The fingers include opposing side edges that are engaged by tabs that extend from the periphery of a clutch drive disc. Each finger is provided with a wear resistant shield structure that overlies at least portions of the side edges that are contacted by the tabs. The basket underside includes shock absorbing springs fitted in pockets which are lined with wear-resistant inserts.

1 Claim, 5 Drawing Sheets

_US 7,287,632 B1_

VEHICLE CLUTCH BASKET

BACKGROUND OF THE INVENTION

1. Field of the Invention

The present invention relates to clutch baskets for vehicle transmissions. More particularly, the invention concerns the use of wear-resistant finger shields and spring pocket liners positioned on selected areas of a clutch basket.

2. Description of Related Art

Motorcycles, dirt bikes and ATVs generally utilize engines that achieve maximum torque at high rpms. To maximize performance from a stopped position, it is necessary to shift gears quickly at increasing torque loads. This action creates significant stress and wear on the side edges of clutch basket fingers that mesh with peripheral tabs extending radially from the clutch drive discs. Over time, the side edges become pitted and grooved to such an extent that the transmission must be dismantled and the basket replaced.

To render a clutch more durable and overcome the above disadvantage, it is known to construct some clutch parts with hardened steel. For example, Maimone in Patent Appl. Publication No. US2004/0000443 A1, constructs the base of a clutch basket with heat-treated tool steel. In U.S. Pat. Nos. 4,505,365 and 4,540,076, a wear-sleeve of hardened steel is pressed onto the outer periphery of a clutch hub portion.

However, until the present invention, no one thought to provide wear-resilient overlays to the most vulnerable areas of the transmission clutch, i.e., the points of contact between the clutch basket and a clutch drive disc and also the clutch basket pockets containing clutch engagement shock absorbing springs. It will be appreciated that the use of specialized finger shield and pocket insert parts provide a substantial savings over the cost to produce an entire clutch basket of tool hardened steel.

SUMMARY OF THE INVENTION

The present invention overcomes the aforementioned disadvantages by locating wear-resistant shields adjacent to at least portions of the clutch basket finger side edges. The shields may comprise a shield body having opposing flanges that overlie respective side edge portions. The body may comprise strips of wear-resistant metal, or comprise an open frame that may extend across the top and down the side edges of a clutch basket finger. Alternative shield bodies may comprise an end cap, sleeve, one or more bands, or a framework of wear-resistant strips held together with cross-braces. The shields are secured to the fingers by attachment means such as mechanical fasteners, frictional engagement, adhesives, heat bonding and welding.

The clutch basket of the invention may further include wear-resistant inserts that fit within pockets on the underside of the clutch basket base. The pockets are formed to constrain shock absorbing means used to provide a bias against the initial rotational force that is imposed upon the clutch basket when the clutch is engaged with the engine drive shaft.

The pockets are generally arranged about an imaginary circle that is concentric with the center axis of the clutch basket. The longitudinal axis of each pocket is preferably about tangential to the imaginary circular line. The pockets are aligned in a succession of spaced-apart recesses. The recesses have a concave shape. The inserts have a cross-sectional shape that is coextensive with the cross-sectional shape of the recesses.

DESCRIPTION OF THE PREFERRED EMBODIMENTS

Figure 1:
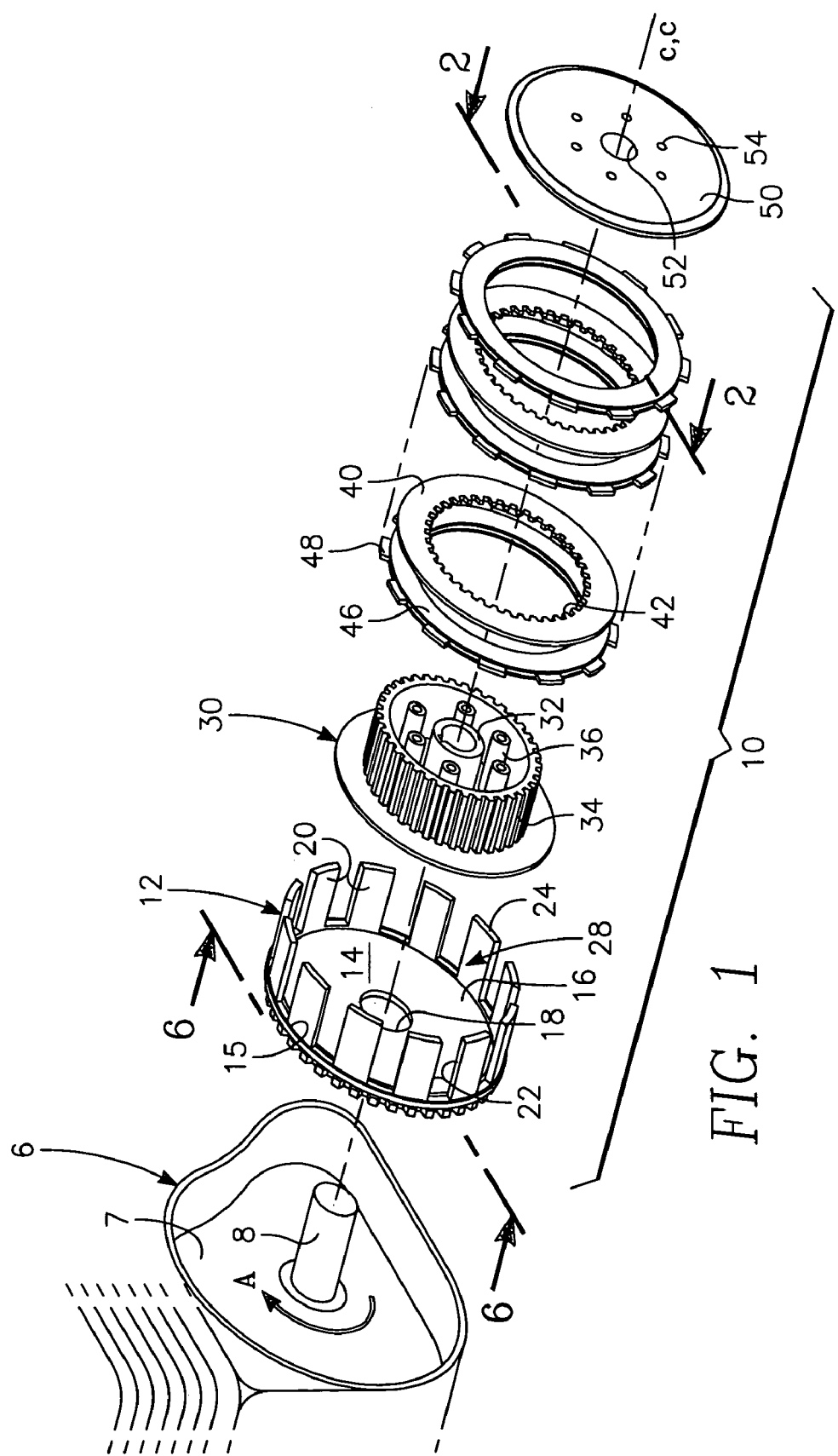
FIG. 1 is an exploded front perspective view of basic elements of a vehicle clutch assembly.
Figure 2:
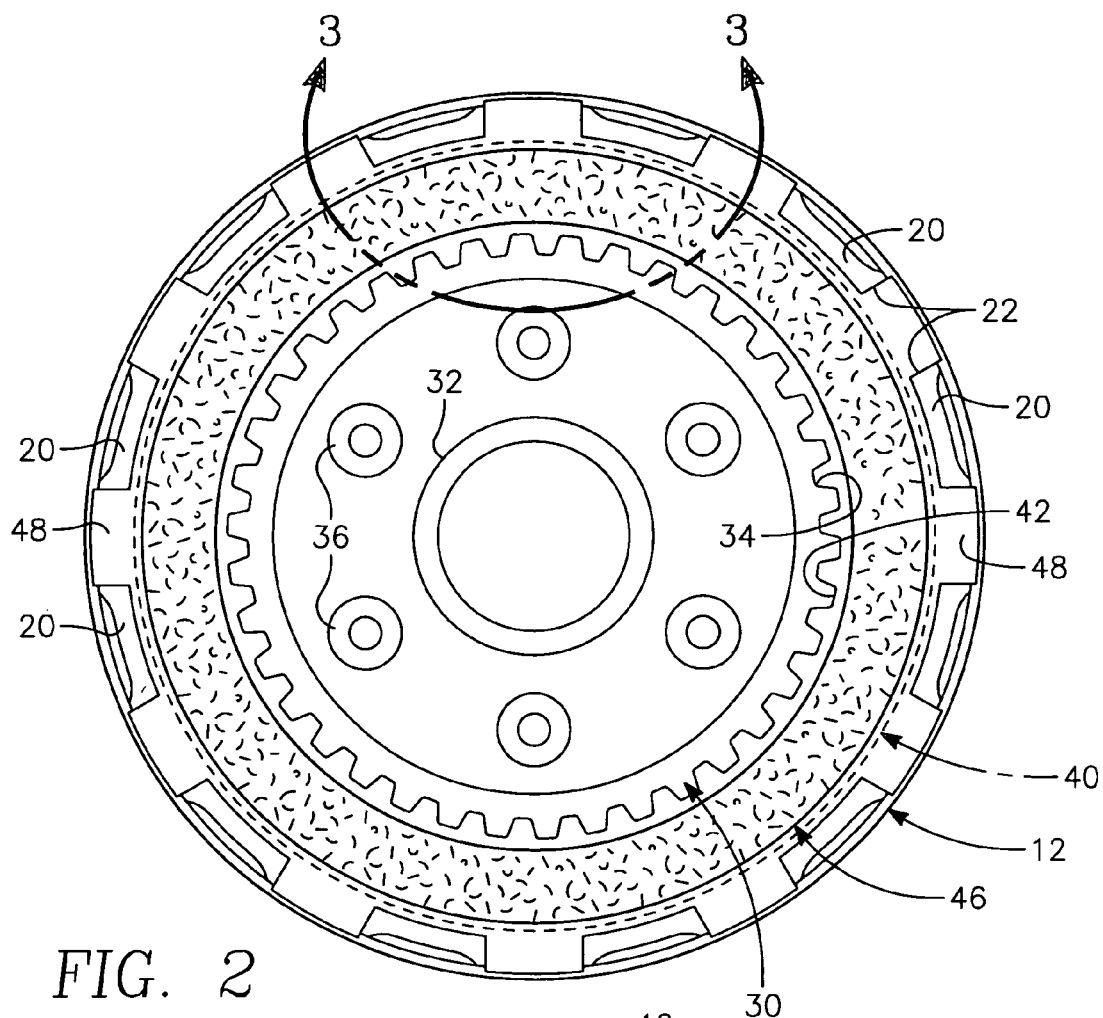
FIG. 2 is a front elevational view taken along lines 2-2 of FIG. 1 showing the assembly joined together.
Figure 3:
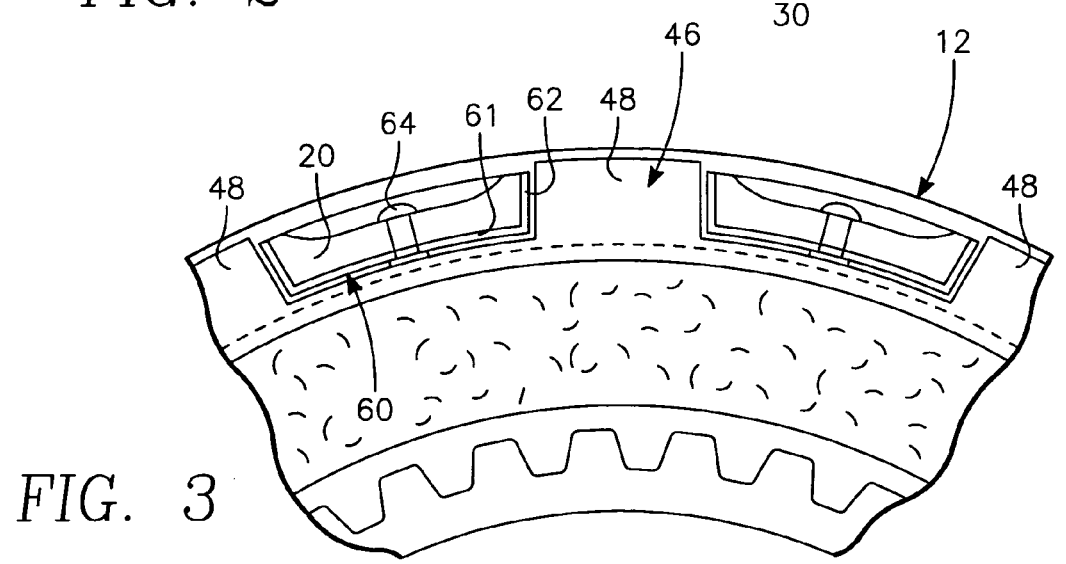
FIG. 3 is an enlarged fragmentary elevational view taken along lines 3-3 of FIG. 2.

With reference now to FIG. 1, the overall environment in which the clutch assembly 10 of the invention operates, is depicted. Engine 6 rotates a driveshaft 8 that projects outwardly from an engine clutch housing 7. For illustrative purposes, the driveshaft is shown by Arrow A as rotating clockwise. It extends through aperture 18 in the base 14 of clutch basket 12. The driveshaft is fixed to hub 30 via hub collar 32. The hub 30 rotates within the interior of the clutch basket 12.

Figure 8:
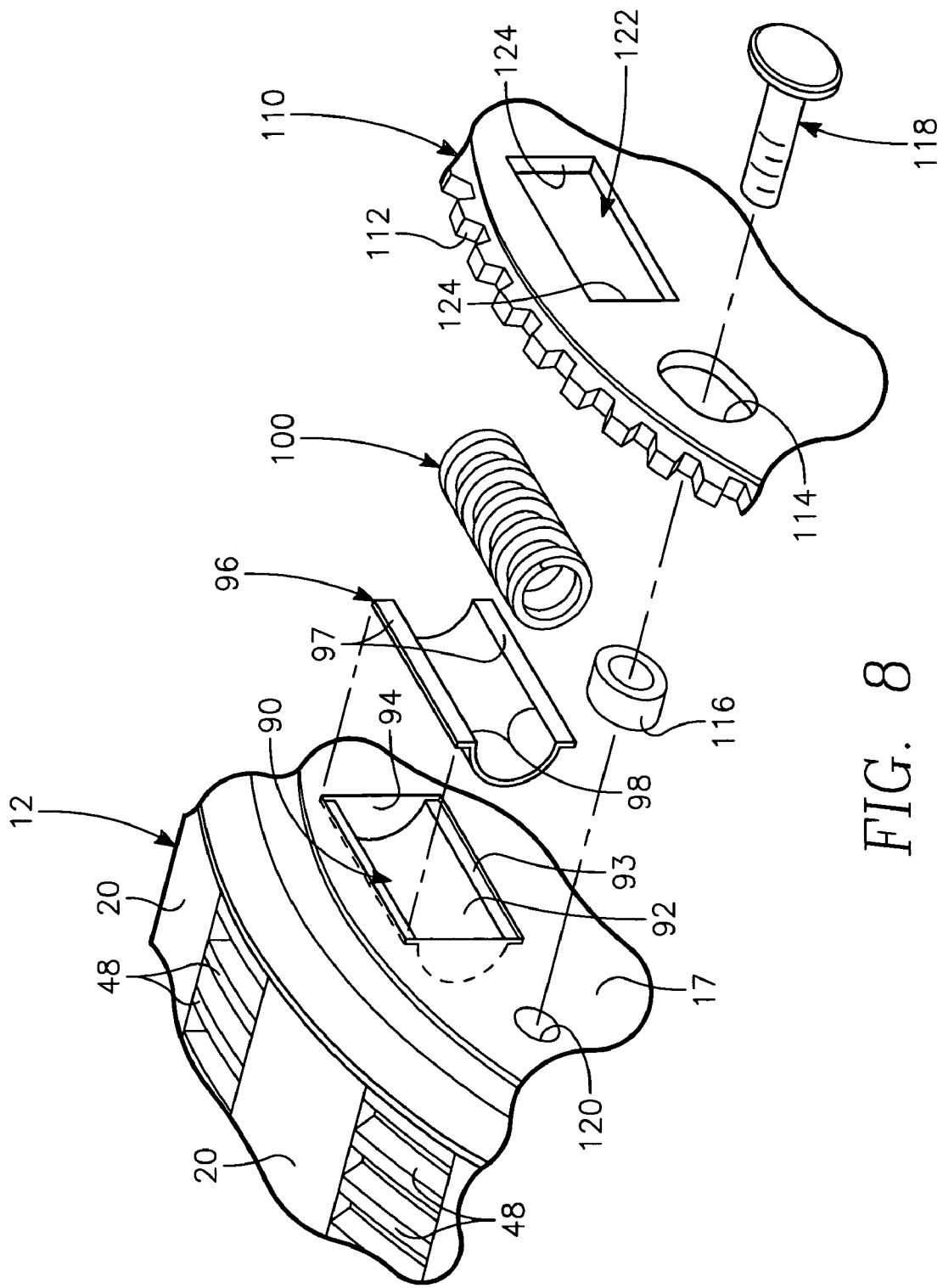
FIG. 8 is an exploded fragmentary view taken along lines 8-8 of FIG. 6.

The clutch basket is generally defined by a base 14 having an upperside 16 from which extends fingers 20. The fingers are spaced-apart a predetermined distance to provide open ended tab slots 28. A transmission drive gear 110 (FIG. 6) is attached to the base underside 17 (FIG. 8).

The hub is provided with gear teeth 34 which engage the inner teeth 42 of the clutch plates 40. The clutch plates are arranged in a stacked alternating relationship with clutch drive discs 46. The drive discs have tabs 48 that project radially outwardly from the drive disc periphery. The tabs fit into the clutch basket tab slots 28.

An outer pressure plate 50 is connected to hub fastener elements 36 via threaded rods (not shown) that extend through connector holes 54. A clutch actuating rod (not shown) extends from the drive shaft through the clutch assembly and is connected to the pressure plate at rod opening 52. When the clutch is disengaged, the hub, clutch plates and pressure plate will rotate along with the driveshaft.

Upon engagement of the clutch, the actuating rod will move rearward toward the engine, causing the pressure plate to be axially drawn against the train of alternating clutch plates and drive discs. This action causes frictional engagement of the clutch plates and drive discs so that they commence rotation in unison. As the drive discs commence rotation, tabs 48 will engage the side edges 22 of the corresponding fingers 20 of the clutch basket 12.

Figure 6:
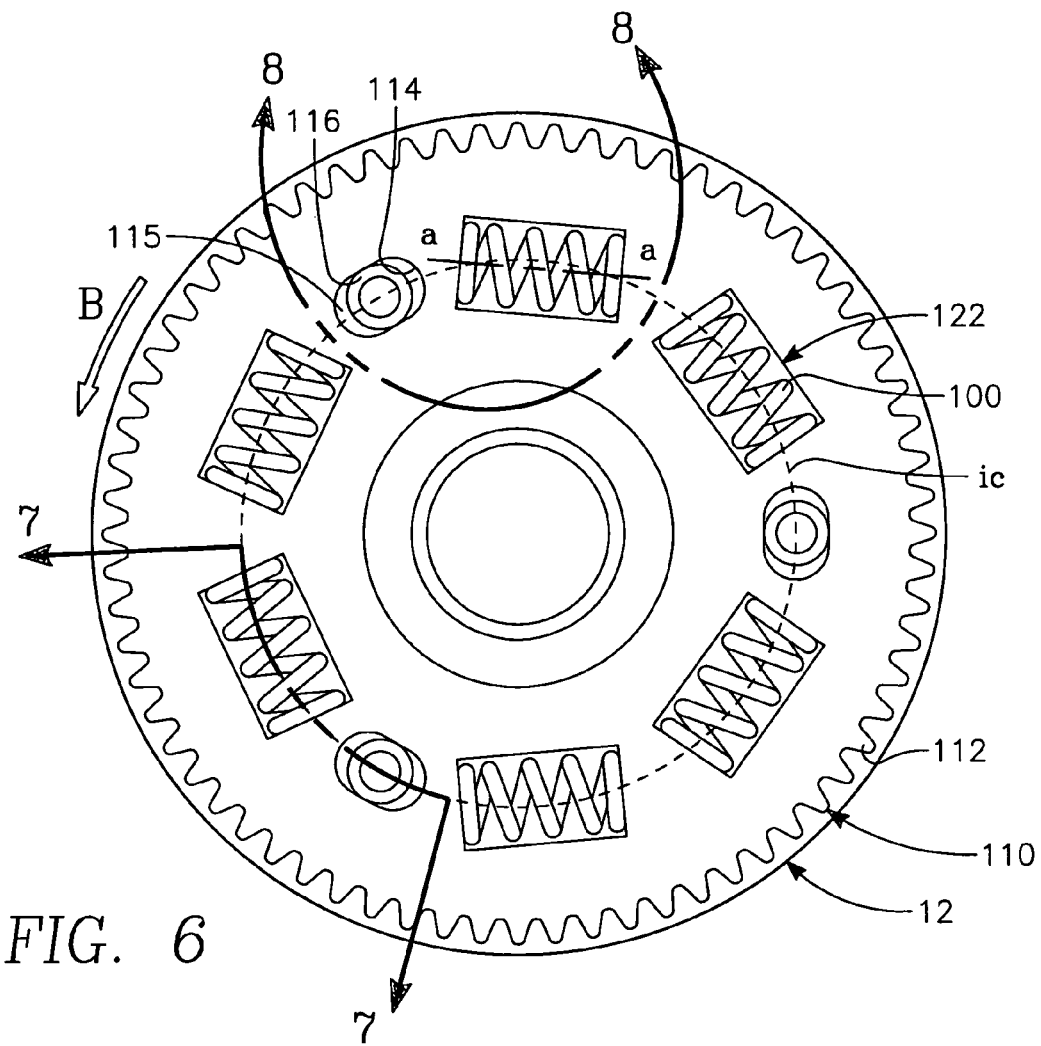
FIG. 6 is an elevational view of the underside of the clutch basket taken along lines 6-6 of FIG. 1.
Figure 7:
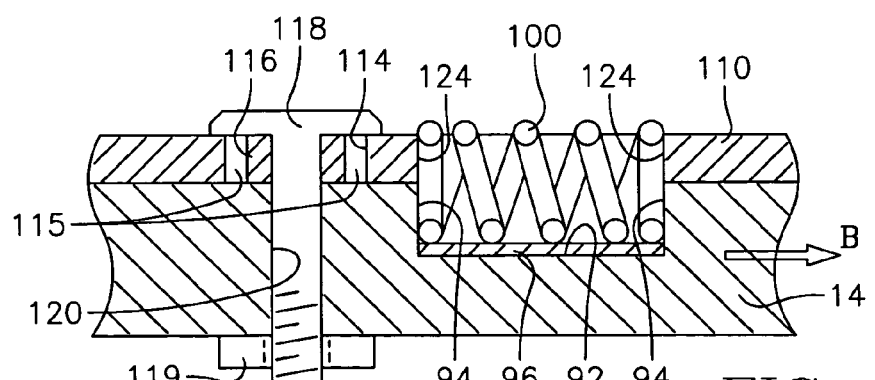
FIG. 7 is a fragmentary cross-sectional view taken along lines 7-7 of FIG. 6.

To diminish an abrupt rotational engagement between the clutch basket and drive gear 110, the clutch basket underside 17 is provided with annularly aligned pockets 90 (FIG. 8). The pockets are sized to accommodate shock absorbing means which may comprise springs, elastic plugs, flex washers, spacers and related linear compressible devices. As shown in FIGS. 6 and 7, coil springs 100 are used which have a coil diameter that is sufficient to extend out of the pocket and into engagement with corresponding abutment openings 122 in drive gear 110. Each abutment opening includes opposing abutment edges 124. The effective length of each spring is sufficient to span the pocket length and abut opposing pocket ends 94 while simultaneously contacting abutment edges 124.

As best shown in FIGS. 6 and 8, the pockets are preferably semi-circular in cross-section, and have a longitudinal pocket axis a,a. To ensure an even distribution of clutch engagement force, the pockets are preferably arranged so that each pocket axis is aligned tangentially to an imaginary circular line i,c, which is concentric to the center axis c,c of the clutch basket 12.

Each pocket 90 extends into the base underside 17 a distance sufficient to effectively constrain spring 100 from becoming easily dislodged from the pocket, but not too deep as not to expose the upper portion of the spring coils. In this way, the exposed portion of the spring may interact with the aforementioned transmission gear plate abutment opening and cushion the initial engagement of the clutch basket.

The pocket is also sufficiently deep to accommodate the thickness of the wear-resistant insert 96. It is expected that the insert will have a cross-section that corresponds with the cross-section of the pocket inner surface 92. The inner surface is provided with a rim recess 93 to accommodate outwardly flared opposing rims 97 that extend from the corresponding top edges of the insert 96.

The drive gear has peripheral gear teeth 112 which engage transmission gears that interconnect vehicle wheel axles in a manner known in the art. The drive gear is provided with oval connector openings 114 within which are fitted round bushings 116. The oval openings have a predetermined length that is sufficient to permit the bushings 116 to move a short distance, shown as span 115, along the circular line i,c for a shock absorbing purpose to be hereinafter described.

The drive gear is secured to basket base 14 by multiple drive connectors 118. The drive connectors 118 extend through the bushings 116 and through the base connector openings 120. As shown in FIG. 7, the end of the connectors are threaded and a connector nut 119 is used to secure the drive gear to the basket base underside 17. However, the securement is not so tight as to prevent a slight rotational movement of the clutch basket relative to the drive gear. Thus, when the clutch assembly 10 is actuated, rotation of the drive gear will be slightly cushioned as the clutch basket, drive connectors 118, and bushings 116 move against the cushioning bias of spring 100 in the direction of Arrow B. During this initial movement, the spring will be compressed by pocket ends 94. After the basket base has moved a distance equal to span 115, the bushing 116 contacts an end of oval 114. Thereafter, drive gear abutment edges 124 will engage the upper portion of spring 100 and full engagement of the drive gear 110 will occur. During this repetitive process, the insert 96 inhibits the spring coils from wearing down and damaging the pocket inner surfaces 92.

With particular reference now to FIGS. 4 and 5, each finger 20 of the clutch basket is defined by opposing side edges 22 which merge into a finger top edge 24. Each finger has an inner face 26 through which extend passages 27 to permit a mechanical fastener to pass through the finger. The side edges may extend from the finger inner face 26 at a given angle. As shown, the angles are slightly greater than 90° wherein they flare outwardly from the inner face.

Overlying at least the wear portions of the finger side edges 22, is a shield 60. The wear portions correspond to the areas upon which drive disc tabs 48 make contact. The shield may comprise a body portion having a width about coextensive with the width of the finger body. The lateral edges of the shield body may then include outwardly extending flanges that will be located adjacent respective side edge portions.

Figures 4A, 4B:
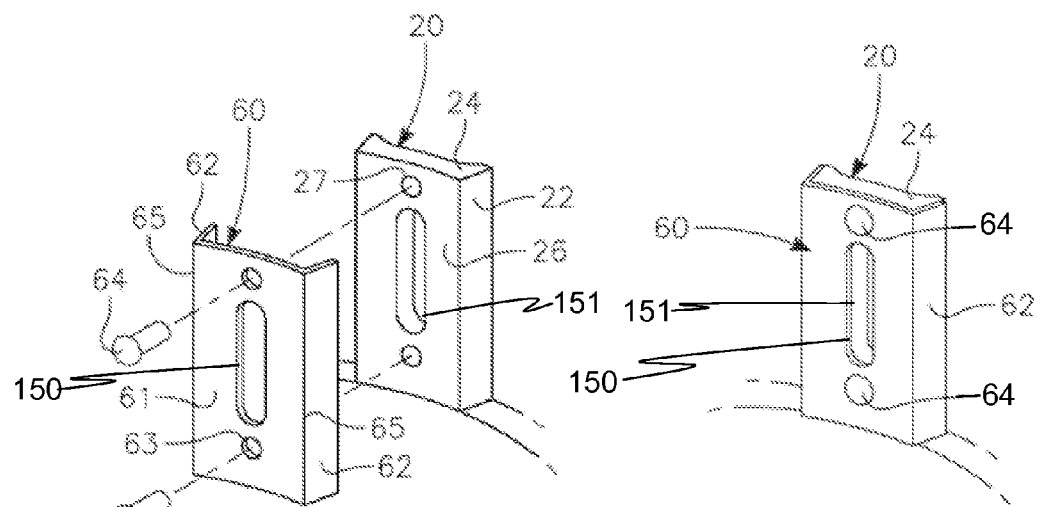
FIG. 4A is an exploded perspective view of a wear-resistant shield moved away from the inner face of a clutch basket finger.
FIG. 4B is a perspective view similar to FIG. 4A, wherein the shield is in place against the clutch basket finger.

In a preferred embodiment shown in FIGS. 4A and 4B, the shield 60 has a solid body 61 with a flange 62 extending outwardly from respective lateral edges of the body. In this case, the shield body has an outline that corresponds to the predetermined outline of each finger, and the flanges extend outwardly at an angle that corresponds to the angle of the side edges.

Each shield may be connected to a finger by a tight frictional engagement, mechanical fasteners, adhesives, heat bonding and welding processes. In FIG. 4A, mechanical fasteners 64 extend through shield opening 63 and into corresponding finger passages 27. A shield may have a shield aperture 150 and the shield aperture may be a shield elongated aperture as shown in FIG. 4A. A finger may have a finger aperture 151 and the finger aperture may be a finger elongated aperture as shown in FIG. 4A. When a finger and shield are connected, the shield aperture 150 is coextensive with the finger aperture 151 as shown in FIG. 4B. The fasteners may comprise rivets, threaded nut and bolt means, screws, pins and expander devices. The particular type of attachment means chosen will be dictated by the particular type of shield being utilized.

Figures 5A, 5B, 5C, 5D:
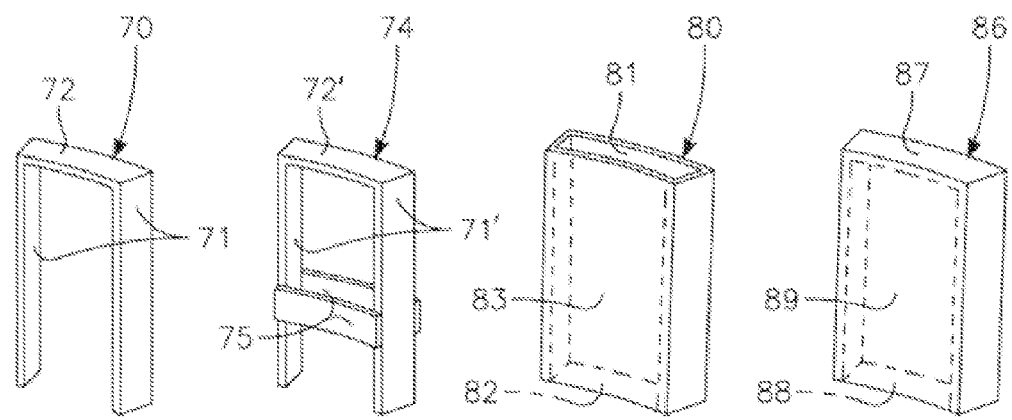
FIG. 5A is a perspective view of a shield in the form of an edge frame.
FIG. 5B is a perspective view showing the shield of 5A as a framework with cross braces.
FIG. 5C is a perspective view of a shield in the form of an open ended sleeve.
FIG. 5D is a perspective view of a shield in the form of an end cap.

Other types of wear-resistant shields may be used to protect the finger side edges from wear. In FIG. 5A, an edge frame 70 is depicted which is defined by opposing side strips 71 that interconnect with a top strip 72. This structure may be placed down over the finger and enclose the corresponding finger top edge 24 and side edges 22. Alternatively, just side strips 71 could be used and secured to the finger side edges 22 by adhesion, heat bonding or welding techniques.

If it is necessary to provide some reinforcement to edge frame 70, a framework 74 may be utilized. As shown in FIG. 5B, this comprises edge frame 72, having cross-braces 75. In this instance, the cross-braces could also be utilized as a connector element for mechanically fastening the framework shield to the finger.

FIG. 5C depicts another alternative shield comprising a sleeve 80. The sleeve has an open top 81, and an open bottom 82, to define an interior cross-sectional shape corresponding to the cross-sectional shape of the finger 20. The sleeve may be fastened by any of the attachment means mentioned above.

A variation of the sleeve is shown in FIG. 5D. This embodiment comprises an end cap 86 having a closed top end 87 and an open bottom end 88. As with the open sleeve, the end cap will have a continuous body portion 89 with a cross-sectional shape that allows the cap to be slid over the top edge 24 of the finger. Both the sleeve 80 and end cap 86 may have varying lengths that at least encompass the finger side edge wear portions of the finger.

From the above descriptions, it can be seen that a significantly improved clutch basket is provided that will have a substantial extended life over standard clutch baskets. Moreover, the invention provides the means for repairing existing clutch baskets without the expense of replacing an entire basket. Moreover, clutch baskets utilizing the wear-resistant shields and inserts described herein, will likely outlive other parts of a vehicle transmission.

While the foregoing descriptions set forth illustrative embodiments of the invention in detail, it will be apparent to those skilled in the art that variations, alterations and modifications could be made without departing from the spirit and scope of the invention. Accordingly, all such variations, alterations and modifications may be utilized, and are deemed to fall within the scope of the invention as claimed.

I claim:

1. A vehicle clutch basket comprising:

a base with a periphery from which extends spaced-apart fingers;

wherein each of said fingers comprise opposing side edges and;

and wherein at least one of said fingers further comprises a finger aperture interposed between the opposing side edges and a wear-resistant shield overlying at least portions of the opposing side edges, wherein the wear-resistant shield comprises a shield body and opposing lateral flanges overlying respective finger side edge portions and wherein the shield body comprises a plate having a shield aperture wherein the shield aperture is coextensive with the finger aperture of the at least one of said fingers and wherein the wear-resistant shield is adapted to be attached to the at least one of said fingers via a mechanical fastener through a shield opening of the wear-resistant shield and a finger passage of the at least one of said fingers;

wherein the base has an underside that includes a plurality of spaced-apart pockets wherein each pocket has an inner arcuate surface and opposing rim recesses;

and wherein the plurality of pockets each includes a wear-resistant insert wherein the wear-resistant inserts have a cross-sectional shape that is coextensive with the cross-sectional shape of said arcuate surface and wherein the wear-resistant inserts have outwardly flared opposing rims.

* * * * *